(12) United States Patent
Minden et al.

(10) Patent No.: US 7,738,751 B1
(45) Date of Patent: Jun. 15, 2010

(54) ALL-FIBER LASER COUPLER WITH HIGH STABILITY

(75) Inventors: Monica L. Minden, Calabasas, CA (US); Shuoqin Wang, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 214 days.

(21) Appl. No.: 12/116,073

(22) Filed: May 6, 2008

(51) Int. Cl.
  *G02B 6/26* (2006.01)
  *G02B 6/04* (2006.01)
(52) U.S. Cl. .......................... 385/27; 385/115; 385/43; 372/6
(58) Field of Classification Search ............... 385/27, 385/115
  See application file for complete search history.

(56) References Cited

U.S. PATENT DOCUMENTS

| | | | |
|---|---|---|---|
| 4,360,372 A | 11/1982 | Maciejko | |
| 4,757,268 A | 7/1988 | Abrams et al. | |
| 4,798,436 A | 1/1989 | Mortimore | |
| 4,915,467 A | 4/1990 | Berkey | |
| 4,932,747 A | 6/1990 | Russell et al. | |
| 5,045,100 A | 9/1991 | Smith et al. | |
| 5,175,779 A | 12/1992 | Mortimore | |
| 5,303,373 A | 4/1994 | Harootian | |
| 5,396,506 A | 3/1995 | Ball | |
| 5,408,556 A | 4/1995 | Wong | |
| 5,566,196 A | 10/1996 | Scifres | |
| 5,852,699 A | 12/1998 | Lissotschenko et al. | |
| 5,881,189 A | 3/1999 | Carberry et al. | |
| 5,936,980 A | 8/1999 | Espindola et al. | |
| 6,134,362 A | 10/2000 | Au-Yeung et al. | |
| 6,208,678 B1 | 3/2001 | King | |
| 6,272,155 B1 | 8/2001 | Sekiguchi | |

(Continued)

FOREIGN PATENT DOCUMENTS

EP    0 547 335 A2   6/1993

(Continued)

OTHER PUBLICATIONS

Kapany, N. S., et al., "Coherent Interactions Between Optical Waveguides and Lasers," *Journal of the Optical Society of America*, vol. 58, No. 9, pp. 1176-1183 (Sep. 1968).

(Continued)

*Primary Examiner*—Sarah Song
(74) *Attorney, Agent, or Firm*—Christie, Parker & Hale LLP

(57) ABSTRACT

An optical coupler is provided for a passive coherent combination of fiber lasers/amplifiers. A plurality of optical fibers are arranged in a close-packed hexagonal array having 1+3n (n+1) fibers with $(3/2)(n^2-n)+3$ interferometrically dark fibers and $(3/2)(n^2+3n)-2$ light fibers, where n is an integer greater than or equal to 1. Each optical fiber has a first end and a second end. The plurality of optical fibers are fused together along a section of each optical fiber proximate the first end of each optical fiber to form a fused section having a fiber axis. The fused section of the plurality of optical fibers is tapered to form a tapered region. A facet is at an end of the fused section. The facet is disposed in a direction perpendicular to the fiber axis. The coherent pattern is highly stable against perturbation.

20 Claims, 16 Drawing Sheets

U.S. PATENT DOCUMENTS

| | | | |
|---|---|---|---|
| 6,366,356 | B1 | 4/2002 | Brosnan et al. |
| 6,400,871 | B1 | 6/2002 | Minden |
| 6,411,762 | B1 | 6/2002 | Anthon et al. |
| 6,434,302 | B1 | 8/2002 | Fidric et al. |
| 6,515,257 | B1 | 2/2003 | Jain et al. |
| 6,827,500 | B2 | 12/2004 | Basavanhally et al. |
| 6,862,386 | B2 | 3/2005 | Corio et al. |
| 7,274,717 | B1 | 9/2007 | Minden et al. |
| 7,342,947 | B1 | 3/2008 | Minden et al. |
| 2003/0031415 | A1 | 2/2003 | Gonthier et al. |
| 2003/0123801 | A1 | 7/2003 | Rolston |
| 2004/0165620 | A1 | 8/2004 | Rogers et al. |
| 2004/0165827 | A1 | 8/2004 | Bruesselbach et al. |
| 2005/0163443 | A1 | 7/2005 | Antos et al. |

FOREIGN PATENT DOCUMENTS

| | | |
|---|---|---|
| GB | 2 154 364 A | 9/1985 |
| GB | 2 191 873 A | 12/1987 |
| WO | WO 2004/001919 A1 | 12/2003 |
| WO | WO 2004/068652 A3 | 8/2004 |

OTHER PUBLICATIONS

Kawasaki, B.S., et al., "Biconical-taper single-mode fiber coupler," *Optics Letters*, vol. 6, No. 7 (Jul. 1981).

Kozlov, V.A., et al., "All-Fiber Coherent Beam Combining of Fiber Laser," *Optics Letters*, vol. 24, No. 24, pp. 1814-1816 (Dec. 15, 1999).

Lyndin, N. M., et al., "Laser System Composed of Several Active Elements Connected by Single-Mode Couplers," *Quantum Electronics*, vol. 24, No. 12, pp. 1058-1061 (1994).

Morel, J., et al., "Coherent Coupling of an Array of $Nd^{3+}$-Doped Single-Mode Fiber Lasers by Use of an Intracavity Phase Grating," *Optics Letters*, vol. 18, No. 18, pp. 1520-1522 (Sep. 15, 1993).

Sabourdy, D., et al, "Efficient Coherent Combining of Widely Tunable Fiber Lasers," *Optics Express*, vol. 11, No. 2, pp. 87-97 (Nov. 22, 2002).

Sabourdy, D., et al., "Power Scaling of Fibre Lasers with All-Fibre Interferometric Cavity," *Electronics Letters*, vol. 38, No. 14, pp. 692-693 (Jul. 4, 2002).

Shirakawa, A., et al., "Coherent Addition of Fiber Lasers by Use of A Fiber Coupler," *Optics Express*, vol. 10, No. 21, pp. 1167-1172 (Oct. 21, 2002).

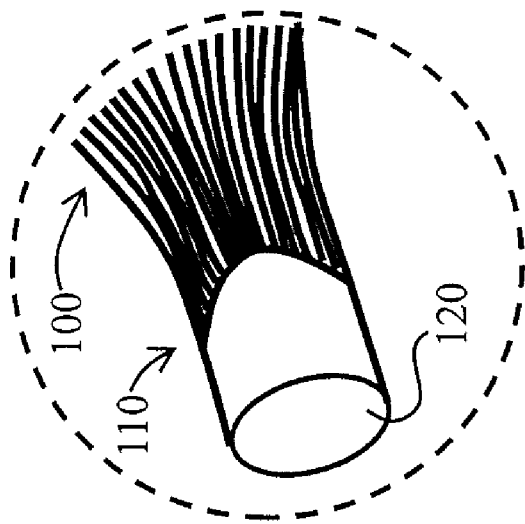
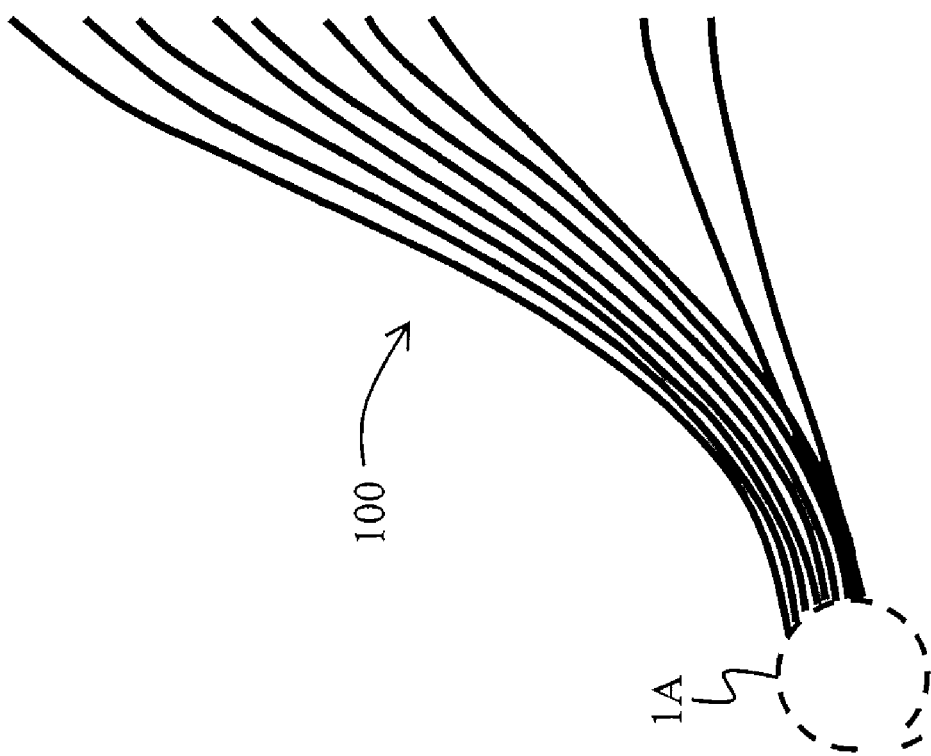

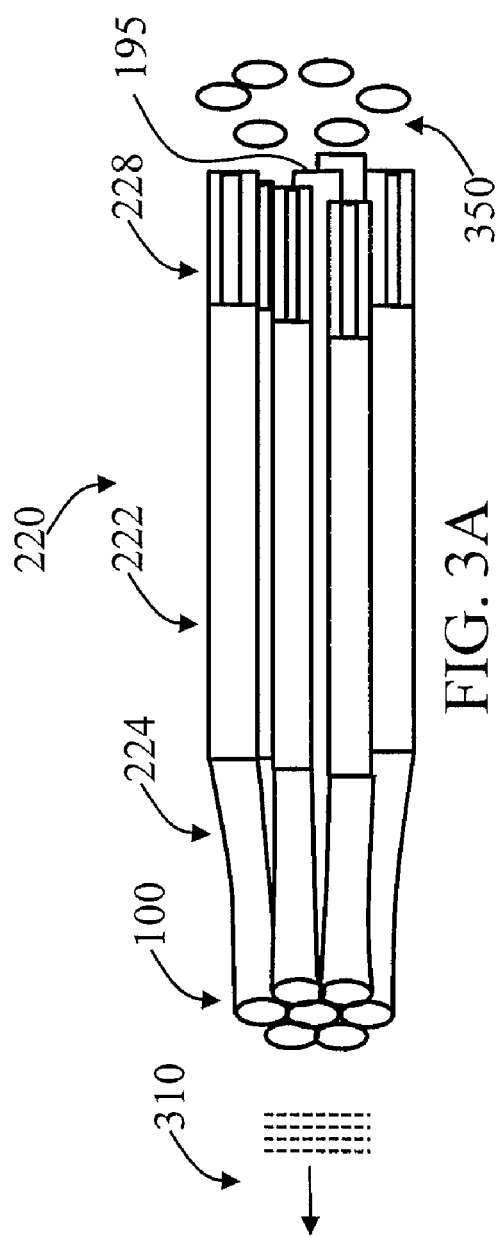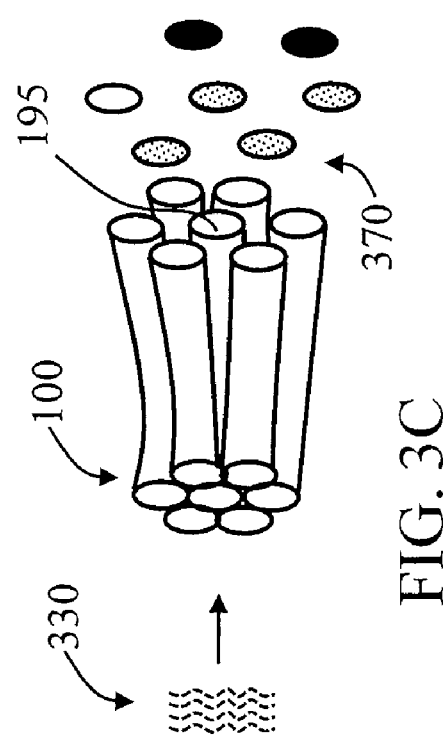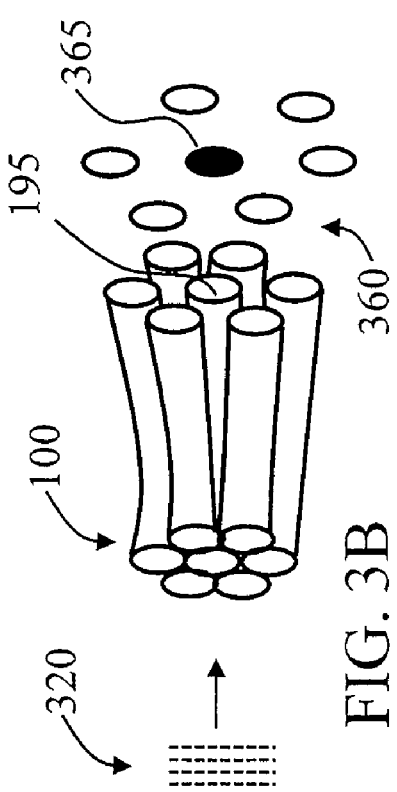

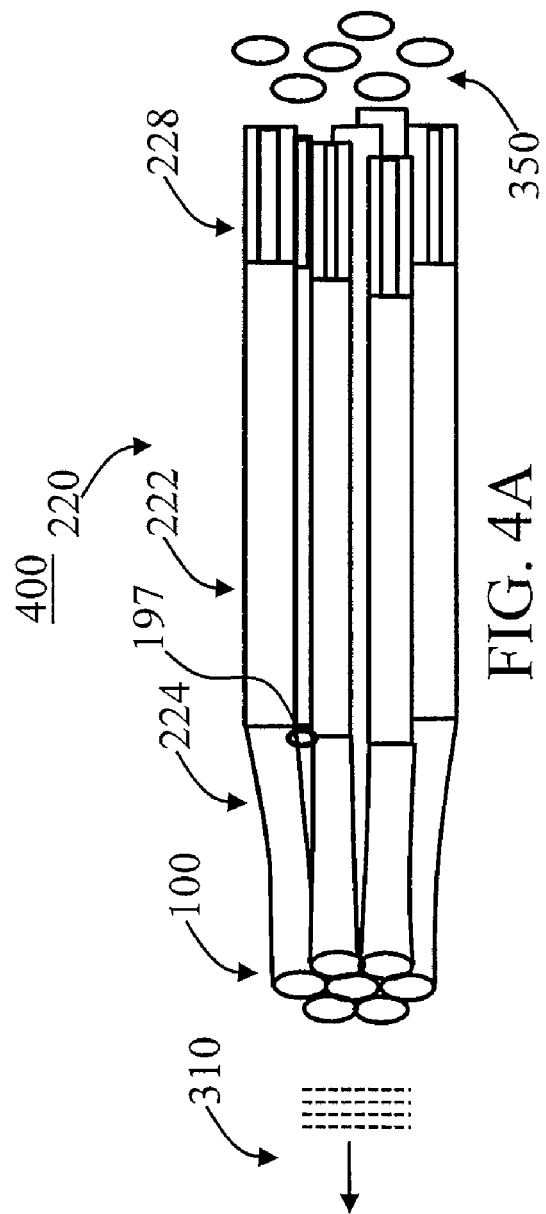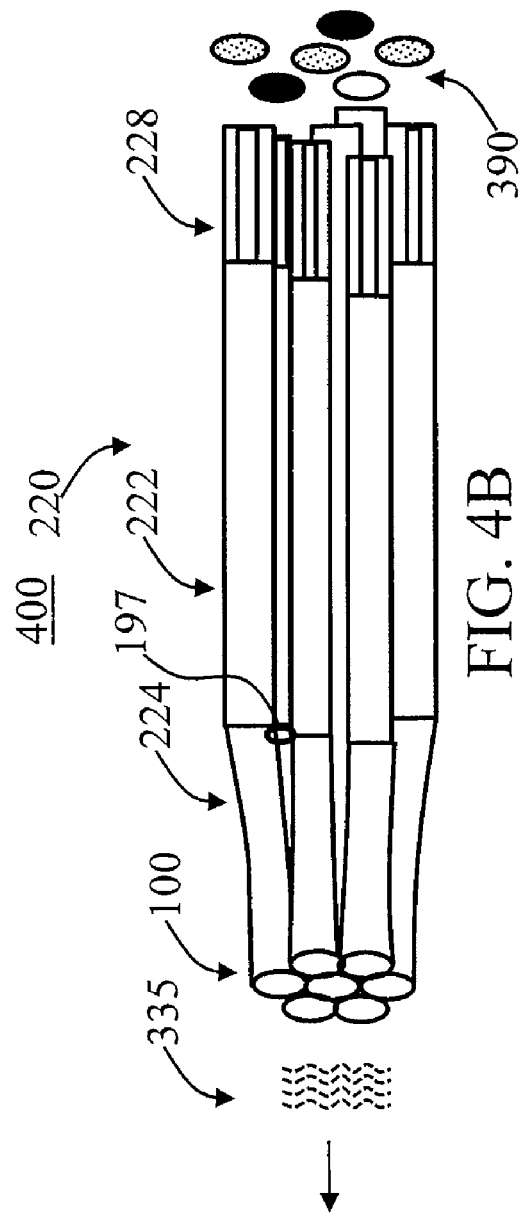

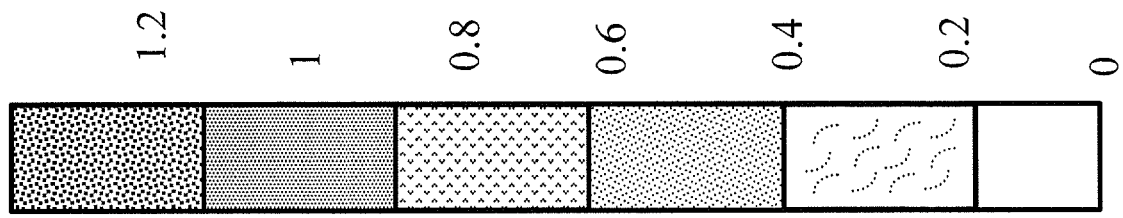
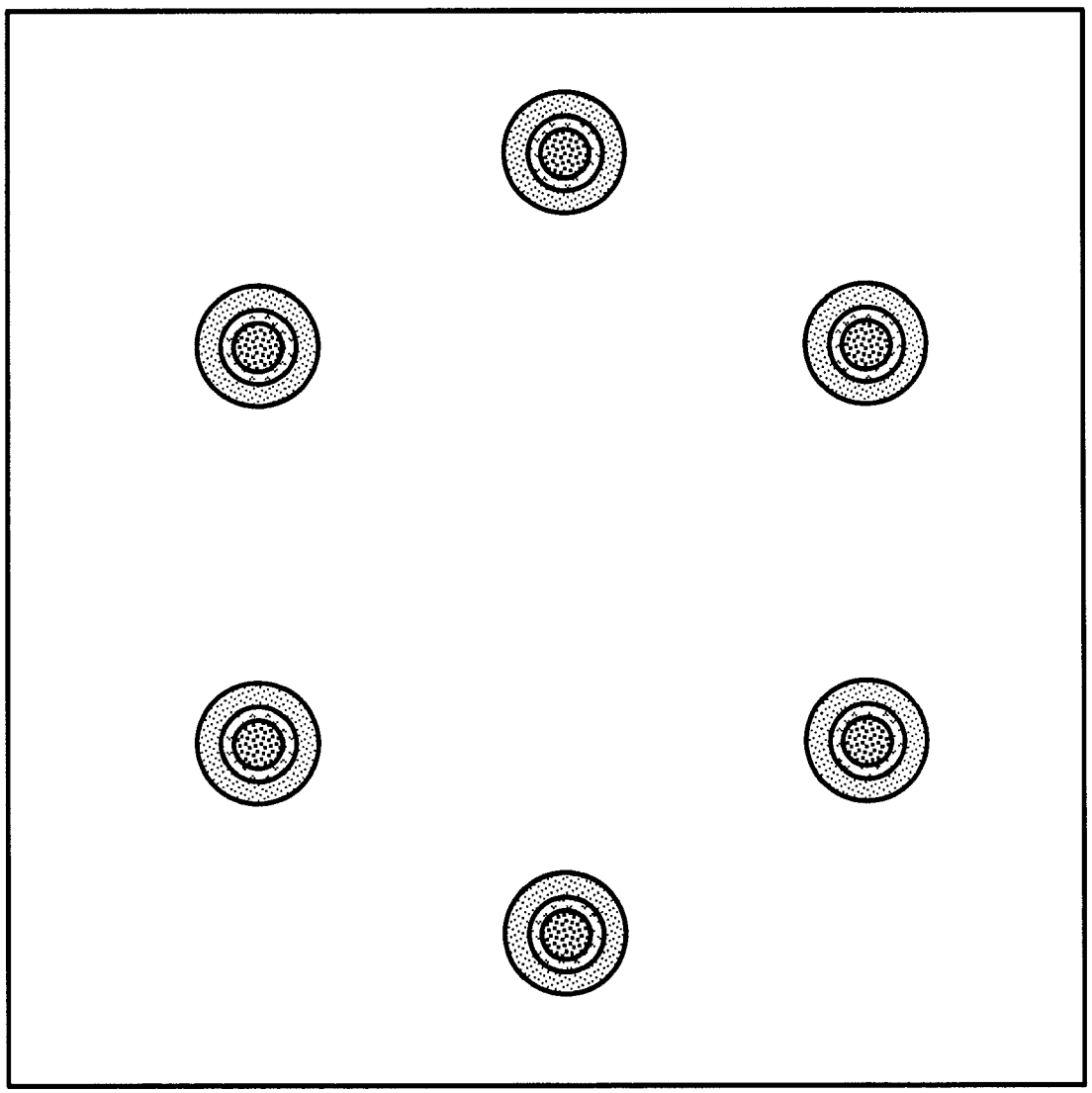
FIG. 7A

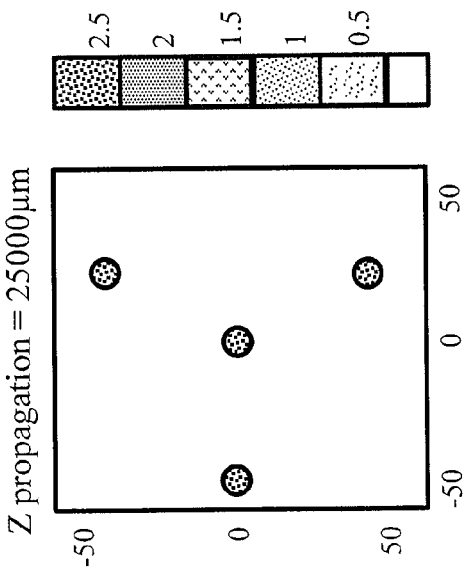
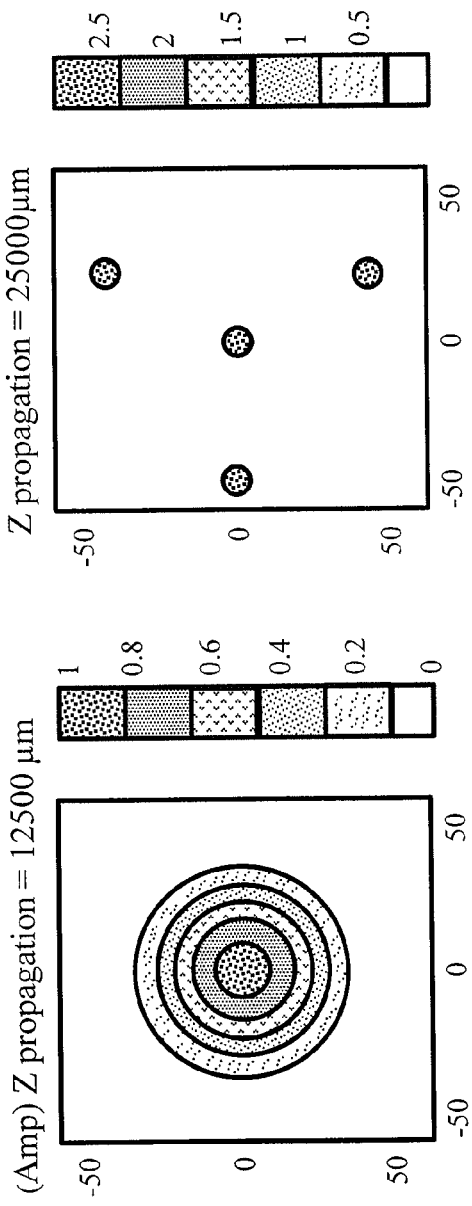
FIG. 9A
FIG. 9B
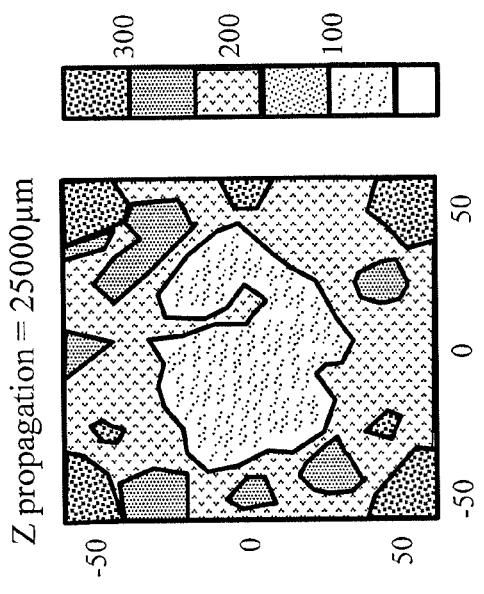
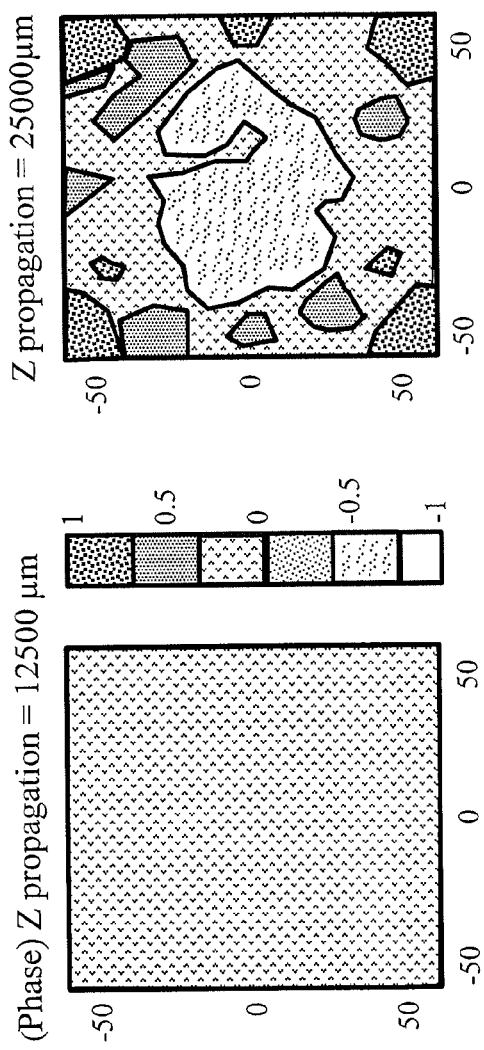
FIG. 9C
FIG. 9D

ALL-FIBER LASER COUPLER WITH HIGH STABILITY

CROSS-REFERENCE TO RELATED APPLICATION(S)

The subject matter of the present application is related to U.S. patent application Ser. No. 10/893,106, now U.S. Pat. No. 7,274,717, entitled "Dark Fiber Laser Array Coupler," which is incorporated herein by reference. The subject matter of the present application is also related to U.S. patent application Ser. No. 10/759,510, entitled "Method and Apparatus for Coherently Combining Multiple Laser Oscillators" and to U.S. patent application Ser. No. 10/759,511, entitled "Method and Apparatus for Combining Laser Light," both of which are incorporated herein by reference.

BACKGROUND OF THE INVENTION

1. Field of the Invention

This disclosure relates generally to lasers, and more particularly, to obtaining a flat wavefront coherent output from a laser oscillator array that is stable against perturbations.

2. Description of Related Art

As described herein, the term "optical" is given the meaning used by those skilled in the art, that is, "optical" generally refers to that part of the electromagnetic spectrum which is generally known as the visible region together with those parts of the infrared and ultraviolet regions at each end of the visible region which are capable of being transmitted by dielectric optical waveguides such as optical fibers. Therefore, discussion of the output of laser devices includes optical outputs from such laser devices within the portions of the electromagnetic spectrum discussed immediately above.

Many potential laser applications such as laser communications, industrial material processing, and remote sensing require the use of laser sources producing high brightness light. High brightness light is typically considered to be light that can be focused into a diffraction-limited or near-diffraction-limited spot. Such high brightness light is typically generated by a single laser with a single transverse mode. A high power laser output typically requires the use of multiple laser sources. High power laser output generally does not demonstrate the flat wavefront coherent output typically seen with a single laser source and is, therefore, not usually classified as high brightness.

One method known in the art for providing a higher power laser output includes directing the output from a master laser oscillator to several laser gain elements used as amplifiers. U.S. Pat. No. 4,757,268, issued Jul. 12, 1988 to Abrams et al., which is incorporated herein by reference, describes such a laser apparatus with N parallel laser gain elements. If the outputs of the N laser gain elements sum incoherently, a brightness equal to N times the brightness of a single laser gain element results. However, in Abrams et al., phase conjugate reflector means are disposed in the optical path of the laser gain elements to provide that the laser beams traveling through the individual laser gain elements sum coherently. This coherent summation of the laser beams provides that the resultant laser apparatus output will have a peak brightness proportional to $N^2$ times the brightness of a single laser gain element. Hence, coherent combination of laser outputs provides for substantial increases in laser output brightness.

The laser apparatus described by Abrams et al. uses a master oscillator including laser devices such as Nd:YAG crystals or diode lasers and several additional optical elements to ensure that the light traveling within the apparatus is properly polarized and directed. Hence, the apparatus described by Abrams et al. may be expensive and difficult to implement.

High power laser systems utilizing a fiber laser as a master oscillator are also known in the art. Fiber lasers are relatively compact and efficient, which reduces the power and weight requirements for systems based on fiber lasers. However, the power output of a single fiber laser without amplification or other power increasing techniques is relatively low. U.S. Pat. No. 6,366,356, issued Apr. 2, 2001 to Brosnan et al., which is incorporated herein by reference, discloses a laser system using a diode pumped fiber laser as a master oscillator and a plurality of fiber amplifiers connected to the master oscillator. The outputs from the plurality of fiber amplifiers are collimated by a lens array to produce a single high power laser beam output.

As briefly described above, coherent combination of multiple laser beams provides a power-law increase in power output. Therefore, Brosnan describes an additional electronic apparatus to correct the phase of the output provided by each fiber amplifier. The ability to compensate for the relative optical phase shifts among the array of fiber amplifiers provides for the preferred coherent combination of outputs. However, the additional circuitry required to detect and compensate for the relative optical phase shifts increases the complexity of the system disclosed by Brosnan. Also, fiber amplifiers are generally less efficient than fiber oscillators (lasers). Therefore, the array of fiber amplifiers disclosed by Brosnan would provide less power than an array of fiber oscillators of the same number. Hence, the system disclosed by Brosnan would be considered more complex and less efficient than a system based on a plurality of fiber oscillators.

Other high power laser systems based on fiber lasers avoid fiber amplifiers by using multiple-core coupler fiber oscillators. U.S. Pat. No. 5,566,196, issued Oct. 15, 1996 to Scifres, which is incorporated herein by reference, describes a fiber laser with two or more generally parallel, nonconcentric doped core regions. The use of multiple cores spreads the light over a larger area of the fiber, thereby reducing the laser power density and reducing the nonlinear optical effects that would otherwise occur at high light intensities. Scifres discloses that the cores may be positioned far enough apart to ensure that light propagating in one core intersects only minimally with light propagating in the other cores, so that each core forms a completely independent laser. However, this configuration does not provide for phase-locking between the light propagating in each of the cores. Scifres also discloses spacing the neighboring cores sufficiently close such that interaction of the light in the cores does occur, thereby providing a phase-locked array of laser emitters in the fiber.

A key problem with multiple-core fiber oscillator systems, such as the system disclosed by Scifres, is heat dissipation. Because the cores are disposed parallel and adjacent to each other along the entire active region of the cores, the heat from each core will be partially transmitted to the adjacent cores. Hence, the power of the multiple-core fiber oscillator systems will be limited by the ability to dissipate the heat generated by the active regions away from the multiple-core fiber, similar to the way that glass rod lasers are limited in average power scaling.

U.S. Pat. No. 6,272,155, issued Aug. 7, 2001, to Sekiguchi, which is incorporated herein by reference, describes the creation of a high intensity optical source through the creation of a high density group of incoherent fibers. See, for example, FIG. 3 of U.S. Pat. No. 6,272,155. If the fibers do not interact, they will lase with their own characteristic frequencies (spectrum of longitudinal modes) and thereby be incoherent.

Sekiguchi discloses that the fibers are to be positioned relative to one another such that they do not interact. The total power output will then increase proportional to the number of sources (N) simply due to energy conservation.

Combining multiple optical sources into a single optical output having optical power nearly equal to the sum of the powers of the individual sources can be accomplished through the combination of the optical sources. One apparatus known in the art for combining N sources is a 1×N fiber coupler. U.S. Pat. No. 5,175,779, issued Dec. 29, 1992 to Mortimore, which is incorporated herein by reference, describes a 1×N single-mode star coupler configured to couple light into multiple fibers at two wavelengths. In Mortimore, multiple single mode fibers are stripped of their primary coating and constrained around a single central fiber, which is also a single mode fiber stripped of its primary coating. All fibers are inserted into a tight fitting silica base glass capillary tube. The fiber and the tube are heated and pulled to form a tapered coupler. During the pulling process, light transmitted through the central fiber and at least one of the multiple fibers disposed around the central fiber is measured. When the light in the central fiber and the fiber disposed around the central fiber is nearly equal at the two desired wavelengths, the pulling process is terminated.

The 1×N star coupler disclosed by Mortimore and other similar apparatus known in the art provide the capability to combine optical sources at relatively lower powers. Furthermore, as the optical power in each fiber is increased, this prior art has the disadvantage that the combined power must propagate in the core of the single central fiber. When the combined optical power is high, undesirable nonlinear effects in, or damage to, the single central fiber may occur. For example, at high optical powers, Stimulated Brillouin Scattering (SBS) may arise. This nonlinear optical effect results from the interaction of the light in the central fiber with acoustic waves in the fiber medium through which the light is propagating, producing inelastic backscattering of the light with a frequency shift equal to the frequency of the acoustic waves. The backward propagating light is amplified at the expense of the forward propagating light. Further, the acoustic waves may also be amplified by this effect, generating an acoustic intensity that can easily damage the single central fiber.

Splitting a single optical source into multiple optical outputs may also be provided by the 1×N star coupler described above, but the power handling capabilities of the coupler are again limited by the single central fiber. Further, if the optical source is a single plane wave, additional optical devices are needed to couple the plane wave into the single central fiber.

Devices are known in the art which allow an optical plane wave to be coupled to multiple fibers without using a single central fiber. For example, U.S. Pat. No. 5,852,699, issued Dec. 22, 1998 to Lissotschenko et al., which is incorporated herein by reference, discloses a coupling element having an array of lenses where each lens focuses an incident light beam onto a specific fiber in a fiber bundle. Hence, the coupling element splits the incident plane wave into multiple light beams, each of which is directed to a separate optical fiber.

The coupling efficiency for coupling an optical plane wave into multiple fibers using the approach disclosed by Lissotschenko (or other similar techniques known in the art) is generally limited to about 30%. Even assuming perfect alignment, the coupling efficiency is limited by the packing of both the fibers in the fiber bundle and the lenses in the array of lenses. The coupling efficiency is further limited by clipping that occurs at the edge of each lens in the array. Finally, the coupling efficiency is reduced because the fiber modes only accept a Gaussian-profiled fraction of the input beam. Therefore, even though the optical plane wave may be a high power optical beam, a significant portion of that power is lost when coupling the beam into multiple fibers using the apparatuses and methods known in the art.

There have been demonstrations of fiber locking via coupling external to the fibers themselves, but such a configuration is not amenable to fabricating a rugged, compact device for field use because (1) a laser oscillator requires two-way propagation and transmission into free space and coupling back into fiber is always very lossy (>20%), (2) coupling high power in and out of fiber requires sturdy and potentially massive alignment fixturing, and (3) independent fiber outputs create a thin array that cannot put sufficient power into the central lobe.

The art described above generally allows multiple laser sources to be combined, however, active phase controls for each of the laser sources is typically required to obtain a high power output with flat wavefront coherent output. That is, active controls on the laser lengths are needed or the lasers need to be made to be equal in length to much less than a wavelength. Such approaches complicate the design and/or fabrication of systems in which multiple laser sources are used to generate high power outputs. Therefore, there is a need in the art for a method and apparatus for generating a high power laser output with a flat wavefront coherent output.

U.S. Pat. No. 7,274,717, entitled "Dark Fiber Laser Array Coupler," provided methods and apparatuses for generating a high power laser output with a flat wavefront coherent output. However, it was not known whether the provided all-fiber geometries were stable against perturbations. Accordingly, there is still a need in the art for a flat wavefront coherent output from a laser oscillator array that is stable against perturbations.

SUMMARY OF THE INVENTION

A method of providing a collimated output from a plurality of lasers is provided. Each output from each laser of the plurality of lasers is coupled to a separate optical fiber in a plurality of optical fibers. The plurality of optical fibers is combined to form a reflective surface receiving the outputs from the plurality of lasers. Fractions of light output from each optical fiber are coupled into other optical fibers to stimulate self-organized phasing of the plurality of lasers. The combination of the plurality of optical fibers are configured to discriminate in favor of a flat wavefront output from the combination of the plurality of optical fibers. The plurality of optical fibers are arranged in a hexagonal array and comprise $1+3n(n+1)$ fibers with $(3/2)(n^2-n)+3$ interferometrically dark fibers and $(3/2)(n^2+3n)-2$ light fibers, where n is an integer greater than or equal to 1.

In an exemplary embodiment of the present invention, the interferometrically dark fibers have a propagation constant different from a propagation constant of the light fibers.

In an exemplary embodiment of the present invention, the interferometrically dark fibers are configured to transmit no light due to destructive interference between light from a laser coupled to the interferometrically dark fibers and the fractions of light output from the light fibers.

In an exemplary embodiment of the present invention, the interferometrically dark fibers and the light fibers have substantially identical outer diameters, but different core diameters.

In an exemplary embodiment of the present invention, n is 1 such that there are 7 fibers with 3 interferometrically dark fibers and 4 light fibers.

In an exemplary embodiment of the present invention, n is 2 such that there are 19 fibers with 6 interferometrically dark fibers and 13 light fibers.

An optical coupler is also provided. A plurality of optical fibers are arranged in a hexagonal array having $1+3n(n+1)$ fibers with $(3/2)(n^2-n)+3$ interferometrically dark fibers and $(3/2)(n^2+3n)-2$ light fibers, where n is an integer greater than or equal to 1. Each optical fiber has a first end and a second end. The plurality of optical fibers are fused together along a section of each optical fiber proximate the first end of each optical fiber to form a fused section having a fiber axis. The fused section of the plurality of optical fibers are tapered to form a tapered region. A facet is at an end of the fused section. The facet is disposed in a direction perpendicular to the fiber axis.

A laser array is provided. The laser array includes a plurality of laser active optical paths. Each laser active optical path includes a doped segment adapted to receive laser pumping energy, a reflector connection segment, a coupling connection segment, and an optical coupler. The optical coupler includes a plurality of optical fibers arranged in a hexagonal array having $1+3n(n+1)$ fibers with $(3/2)(n^2-n)+3$ interferometrically dark fibers and $(3/2)(n^2+3n)-2$ light fibers, where n is an integer greater than or equal to 1. Each optical fiber has a first end and a second end. The first end of each optical fiber is coupled to one laser active optical path at the coupling connection segment of the laser active optical path. The plurality of optical fibers are fused together along a section of each optical fiber proximate the second end of each optical fiber to form a fused section having a fiber axis. The fused section of the plurality of optical fibers are tapered to form a tapered region. The laser array further includes a facet. The facet is formed by cleaving or cutting and polishing the tapered region in a direction perpendicular to the fiber axis. The interferometrically dark fibers have a propagation constant different from a propagation constant of the light fibers and are configured to transmit no light due to destructive interference between light from a laser coupled to the interferometrically dark fibers and at least a portion of light output from the light fibers.

BRIEF DESCRIPTION OF THE DRAWINGS

FIG. 1 shows an optical coupler comprising a bundle of fused fibers for use in embodiments of the present invention.

FIG. 1A shows an enlarged view of the fused end of the fiber bundle depicted in FIG. 1.

FIG. 3A shows a laser array depicted in FIG. 2 configured to produce a collimated output.

FIG. 3B shows the application of a collimated input to the coupler used in the array shown in FIG. 3A.

FIG. 3C shows the application of an aberrated input to the coupler used in the array shown in FIG. 3A.

FIG. 4A shows the impact of the inclusion of a gain block in one of the fiber paths of the laser array depicted in FIG. 3A.

FIG. 4B shows the impact of the inclusion of a gain block in one of the fiber paths in a laser array when the coupler combining the outputs from the lasers is not configured to produce a collimated output.

FIG. 7A, FIG. 7B, FIG. 7C, and FIG. 7D show the calculated optical outputs for various configurations of couplers according to the present invention.

FIG. 9A, FIG. 9B, FIG. 9C, and FIG. 9D depict the optical fields of an all-fiber geometry for a stable coherent fiber laser array output according to an exemplary embodiment of the present invention.

DETAILED DESCRIPTION

Figure 2:
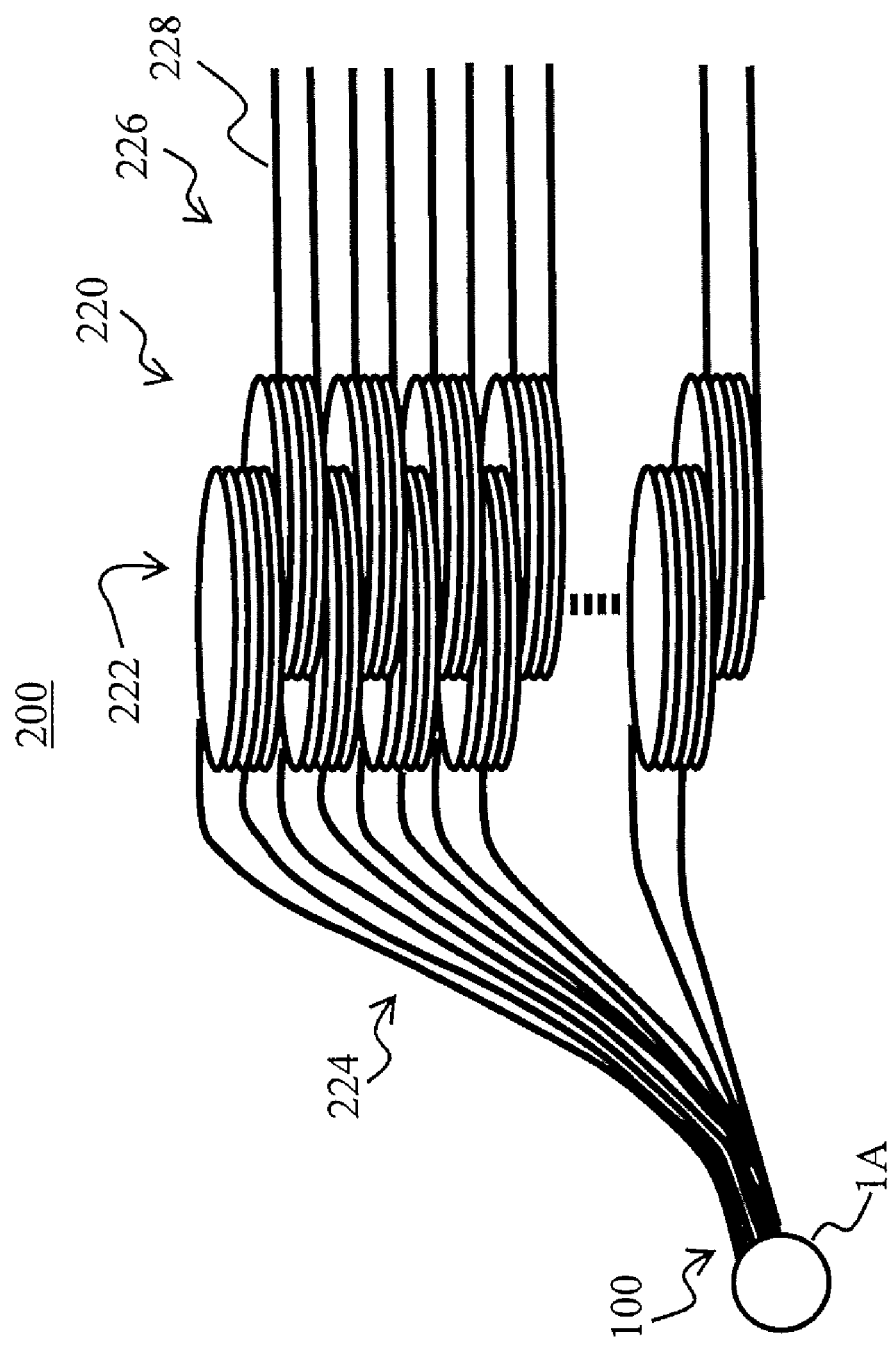
FIG. 2 shows a laser array according to an embodiment of the present invention.

Embodiments of the present invention provide a method and apparatus for coupling a plurality of laser devices and utilizing interactions between the plurality of laser devices to form a flat wavefront coherent optical output that is stable against perturbations. Embodiments of the present invention also employ one or more interferometrically dark fibers to ensure that the outputs from interferometrically lit fibers have fairly uniform intensity.

FIGS. 1-7D provide methods and apparatuses for generating a high power laser output with a flat wavefront coherent output. FIGS. 8-12D provide methods and apparatuses for a flat wavefront coherent output from a laser oscillator array that is stable against perturbations.

As described herein, an interferometrically dark fiber is a member of a fiber array, which, under uniform illumination, transmits no light because of destructive interference between the light coupled directly into that fiber from the external illumination and the light coupled into the fiber via evanescent coupling from adjacent fibers.

An embodiment according to the present invention includes a multiple-fiber device, a stretched, fused and cleaved coupler, designed to act as an output window to a fiber laser array or fiber-coupled laser array. By careful choice of the type of fibers, their stretch, their length and their position, the coupler can be designed to facilitate the in-phase oscillation of the lasers in the array. Specifically, the interference of the various fibers is made such that, if (and only if) light illuminating the cleaved face is uniform and collimated, then certain of the attached fibers will be interferometrically dark. The other fibers, the interferometrically lit ones, are made to have fairly uniform intensity under the same collimated illumination.

The coupler according to an embodiment of the present invention mixes the light reflected back into the various independent lasers of an array in such a way that a spectrally coherent and spatially flat wavefront is emitted from the array. Lasers are nonlinear oscillators that can self-organize into a coherent state, that is, one with definite phase relationships between each other. However, the ideal laser array output is not just one with phases that are defined relative to each other, but one with phases that are exactly equal to each other. The coupler according to an exemplary embodiment of the present invention is designed to increase the losses in the composite laser array if the phases are not equal. Conversely, then, the flat wavefront output is the least lossy state the laser array can assume. Thus, the coupler discriminates in favor of a flat wavefront.

By reciprocity, if the direction of the light is reversed, then the output of the coupler will be uniform and collimated. The interferometrically dark fibers will be left broken or lossy. In an embodiment of the present invention, the interferometrically lit fibers will be attached to the output of a laser device. When the light reaching and reflected from the cleaved coupler face is ideally collimated and uniform, there is no net loss because those fibers were dark anyway. However, if the light reflected from the cleaved coupler face deviates from the ideal, then light propagates in the broken or lossy fibers, and there is a net loss of light.

FIG. 1 illustrates an optical coupler for use in embodiments of the present invention, in which the optical coupler 100 comprises a large bundle of regularly arrayed optical fibers 110. The optical fibers 110 are preferably single-mode fibers. The optical fibers 110 are fused at one end and stretched. The fused end is cut and polished (or cleaved) to produce a facet 120 through which a free space optical beam can be received or transmitted. FIG. 1A shows an enlarged view of the coupler 100 having the fused fibers 110 and the facet 120. FIG. 1A also shows a taper of the bundle at the point where it is cut and polished to produce the facet 120. The optical coupler 100 illustrated in FIG. 1 and FIG. 1A is described in more detail in U.S. patent application Ser. No. 10/759,511, which is incorporated herein by reference.

The optical coupler 100 depicted in FIG. 1 and FIG. 1A may be fabricated by assembling the optical fibers 110 in the fiber bundle in a regular array. Such arrays include hexagonal close packing, square packing, and a three-nearest-neighbor packing. Although manufacturing tolerances may result in a certain amount of randomness in the array, the device is still useful even if the optical fibers 110 are not perfectly arranged. This array of fibers 110 is then fused together and stretched using techniques well known in the art, such as those techniques used for the fabrication of tapered fiber couplers. Fusing the fibers 110 provides that the light in one fiber may be coupled to other fibers in the stretched region of the fiber. After the bundle of fibers 110 has been fused and stretched, the bundle is cut and polished, or cleaved, at a selected location to provide the facet 120. The facet 120 provides for the entrance of a single beam into the apparatus and the distribution of that beam among the optical fibers in the array. The facet 120 also provides for the exit of a single beam from the apparatus, which may be fed by optical sources coupled to the multiple fibers 110.

A laser array 200 according to an embodiment of the present invention, which incorporates the optical coupler shown in FIG. 1 and FIG. 1A, is shown in FIG. 2. The laser 200 comprises a plurality of optical fiber paths 220 and the coupler 100. Each optical fiber path 220 comprises a doped segment 222, which receives laser pumping energy; a coupling connection segment 224, which connects the optical fiber path 220 to the coupler 100; and a reflector connection segment 226, which contains a fiber grating reflector 228 or similar high reflectivity device. Each optical fiber path 220 may comprise a single optical fiber with the described segments or may comprise multiple optical fibers coupled together to form the described segments using techniques known in the art.

Each optical fiber path 220 forms a fiber oscillator due to the application of pump energy to the doped segment 222 and the resonant cavity formed by the surface of the facet 120 at the coupler 100 and the fiber grating reflector 228 in each optical fiber path 220. Therefore, the coupler 100 provides the ability to combine the laser light from each optical fiber path 220 into a single laser beam. The degree of coupling between the laser light from each optical fiber path 220 can be controlled by the amount of stretch and the length of the bundled fibers at the coupler 100. The fibers are tuned to give the required degree of coupling for a particular connectivity. Preferably, the fibers are not narrowed so much that they no longer support a propagating mode. The laser array 200 depicted in FIG. 2 is described in additional detail in U.S. patent application Ser. No. 10/759,510.

According to embodiments of the present invention, the output coupler 100 is configured such that it yields a specific optical response to illumination of the cleaved face by a uniform collimated beam. Part of the collimated light is reflected or scattered, but part of the light enters into the coupler 100, and propagates through it, guided loosely by the cores of the bundled fibers 110. Along the length where fibers 110 are fused, there is coupling and interference between the light in each fiber 110 and each of the other fibers 110. As the fibers 110 separate from each other away from the fused region, each fiber 110 will have more or less of the incident light propagating inside. In an exemplary embodiment of the present invention, each fiber will either be equally light or completely dark, with no mixture of mid-range intensities.

FIG. 3A shows an embodiment of the invention configured as the laser array depicted in FIG. 2. Multiple optical fiber paths 220, including doped segments 222, which receive laser pumping energy, coupling connection segments 224, and fiber grating reflectors 228, are coupled to the optical coupler 100 with the coupling connection segments 224. The application of laser pump energy at the doped segments 222 creates laser energy within the optical fiber paths 220. However, one optical fiber 195 is configured to be interferometrically dark. The laser energy in the other optical fiber paths 220 will self organize such that laser energy in the optical fiber paths 220 will have equal or nearly equal phase. The laser light output 310 from the coupler 100 will be coherent such that the intensity from each lit fiber will be uniformly illuminated and in phase. The light pattern 350 of the light that leaks from the optical fiber paths 220 shows the absence of light in the optical fiber 195 that is interferometrically dark.

The presence of an interferometrically dark fiber in the optical coupler 100 may be found by reciprocity. That is, rather than using the optical coupler 100 to produce a collimated output, a collimated input may be applied to the coupler 100. FIG. 3B illustrates the application of collimated light 320 to the optical coupler 100 having one interferometrically dark fiber 195. As discussed above, each interferometrically lit fiber will have a portion of the incident light propagating within the fiber and produce a light output while each interferometrically dark fiber 195 will produce no output. Therefore, FIG. 3B shows a light pattern 360 comprising a beam output from each lit fiber and no beam 365 from the interferometrically dark fiber 195.

As discussed above and shown in FIG. 3B, the application of a collimated light input to the optical coupler 100 with one or more interferometrically dark fibers will result in the optical fibers coupled to the coupler 100 being either completely lit or completely dark. There should be no fibers that have a light intensity that is in between completely lit or completely dark. On the other hand, the application of an aberrated light input to the coupler 100 with one or more interferometrically dark fibers will result in the fibers having different light intensities. FIG. 3C shows the application of aberrated light 330 to the optical coupler 100 with one interferometrically dark fiber 195. The resulting light pattern 370 shows that the light output from each of the fibers has different intensities and the interferometrically dark fiber 195 also produces an output.

A coherent array wavefront is sometimes referred to as a supermode. According to embodiments of the present invention, laser arrays using the optical coupler as described above will provide extremely strong discrimination to favor the desired flat wavefront supermode. In laser arrays according to embodiments of the present invention, the lowest loss occurs when the output wavefront from the laser array is flat. FIG. 4A and FIG. 4B illustrate that the lowest loss array mode is one in which the output waveform is flat. FIG. 4A illustrates a laser array 400 similar to that depicted in FIG. 3A producing a collimated light output 310. However, a gain block 197 is attached to one of the optical fibers 220 of the coupler 100. With the collimated output 310, no light will be reflected into the fiber with the gain block 197, so no reflected light will be lost in the fiber with the gain block 197. The light pattern 350 shows that no light is present in the fiber path 220 with the gain block 197. FIG. 4B illustrates that an aberrated light output 335 will cause light to be reflected into the fiber path 220 with the gain block 197, inducing loss in the laser array 400. The loss is shown by the uneven distribution of light intensities in the light pattern 390 of the light that leaks from the optical fiber paths 220. Hence, FIG. 4A and FIG. 4B show that the lowest loss laser array mode is one that is flat, not aberrated.

The creation of a laser array with an optical coupler as described above with one or more interferometrically dark fibers requires unequal coupling or unequal phase distribution between elements of the laser array. Thus, an optical coupler with one or more dark fibers, i.e., a dark fiber coupler, may be formed with a mixture of fiber types or fiber properties with, for example, two or more propagation constants, different core or cladding dimensions, or asymmetrical positions of the fibers in the coupler. Imperfections of the fibers or the fiber pulling process to create a tapered fused fiber bundle may create the requisite mixture of fiber properties unintentionally.

As illustrated in FIG. 3B, an embodiment of a dark fiber coupler according to the present invention may be found by creating a tapered, fused, and cleaved fiber bundle, such as illustrated in FIG. 1 and FIG. 1A, and testing the fiber bundle to determine if collimated illumination of the optical coupler yields one or more interferometrically dark fibers. That is, by reciprocity, if the optical coupler is found to produce one or more dark fiber outputs (such as pattern 365 shown in FIG. 3B) upon the application of a collimated light input, the use of that coupler should produce a collimated light output when used in laser arrays according to embodiments of the present invention. However, it may be difficult to consistently produce a coupler with the requisite interferometrically dark fibers.

Figure 5A:
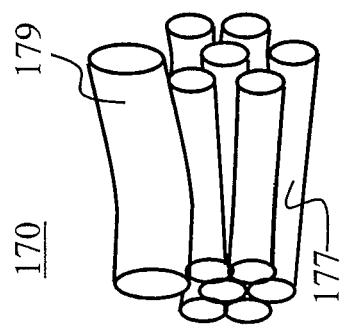
FIG. 5A shows a dark fiber according to an embodiment of the present invention.
Figure 5B:
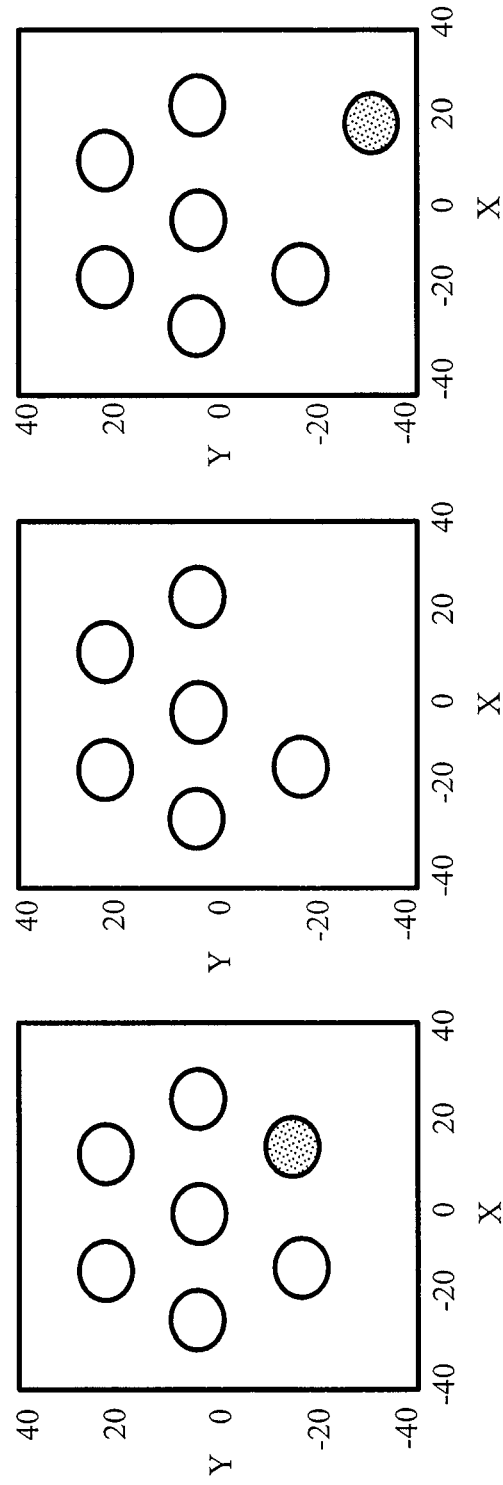
FIG. 5B shows the optical outputs from an optical coupler having various fiber offsets.

A dark fiber coupler 170 according to an another embodiment of the present invention is depicted in FIG. 5A. Identical fibers 177 are used in all positions of the fibers in the coupler, except for one or more fibers 179 that have characteristics that provide that those fibers 179 will be interferometrically dark. FIG. 5A shows the interferometrically dark fiber 179, as having a larger diameter than the other fibers 177 and offset from the other fibers 177, but other characteristics of the fiber may support the creation of an interferometrically dark fiber. FIG. 5B shows calculated optical intensity from the coupler 170 with the seven fiber bundle depicted in FIG. 5A and with varying offsets of the dark fiber 179 from the other fibers 177. As shown in FIG. 5B, the offset fiber 179 may produce no output or a less intense output upon the input of collimated light to the dark fiber coupler 170.

An exemplary embodiment of a dark fiber coupler comprises an array of optical fibers laid out in a hexagonal pattern and tapered, fused, and cleaved as described above. This embodiment is particularly appealing because it is relatively straightforward to fabricate, is scalable to very large arrays of fibers, and may use commercial-off-the-shelf optical fibers.

Figure 6:
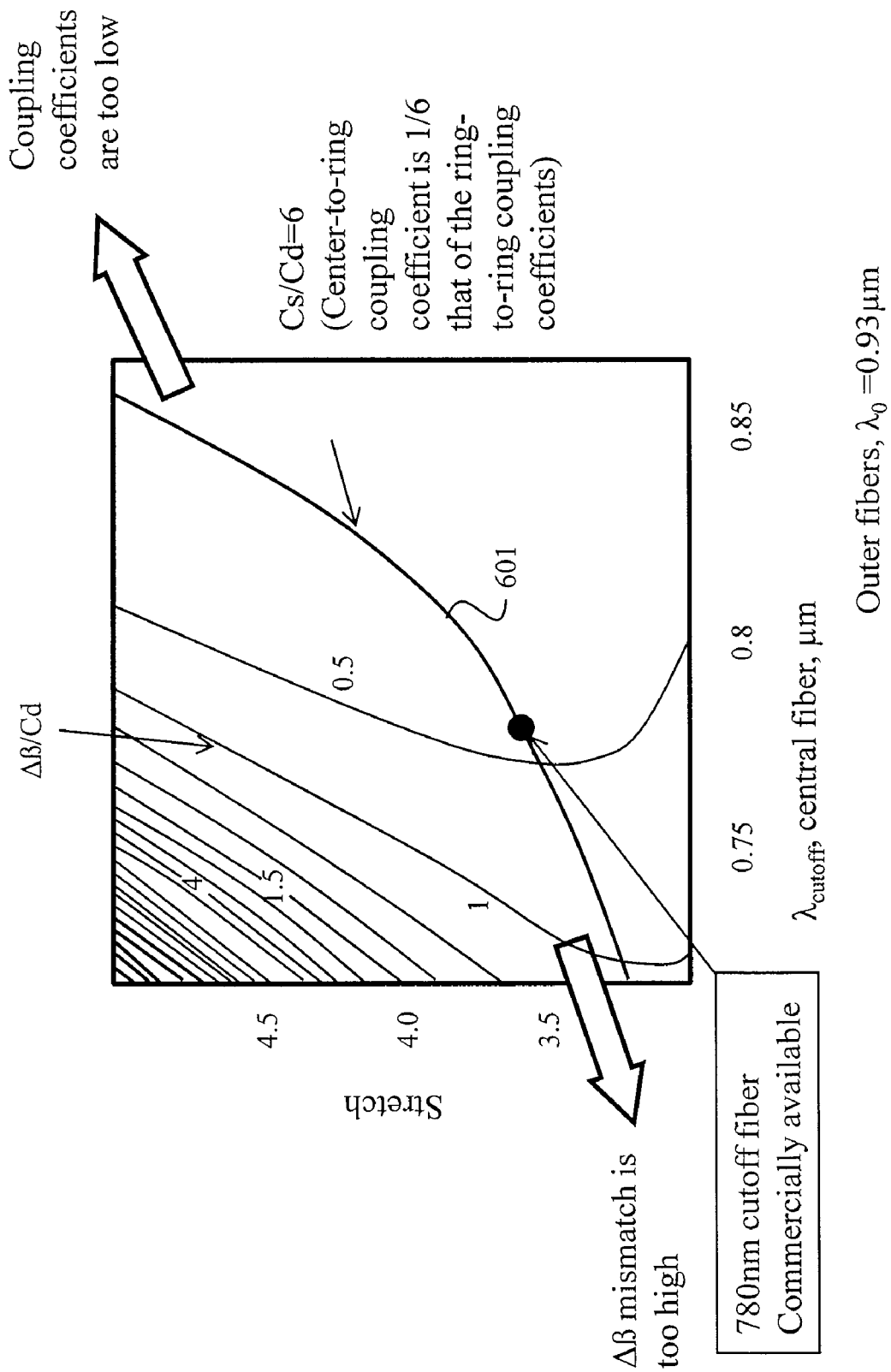
FIG. 6 shows a graph of the cutoff wavelength of a central fiber versus the stretch applied to the fiber for the desired coupling to surrounding fibers in accordance with an embodiment of the present invention.

The optical fibers in the array in an exemplary embodiment are laid out in a symmetrical pattern with a lower $2^{nd}$-mode cutoff fiber surrounded by a ring of a higher $2^{nd}$-mode cutoff fiber, and set in a much larger glass matrix. In an exemplary embodiment, the fibers that are to be dark have ⅙ the coupling to the fibers around them as the ring of surrounding fibers has to each other. This differing degree of coupling can be found, for example, using fibers with different cutoff wavelengths. FIG. 6 shows a line 601 representing solutions in which Corning® HI 1060 specialty fiber ($2^{nd}$-mode cutoff ~0.931 um) is paired with another fiber of a lower cutoff wavelength to provide a factor of 6 ratio between same-fiber and different-fiber coupling coefficients. Corning® is a registered trademark of Corning Incorporated, Corning, N.Y. 14831. The desired coupling coefficients can be obtained for a range of stretch and $2^{nd}$-mode cutoff values.

The propagation through the dark fiber coupler according to the exemplary embodiment described above was modeled. In the modeling, the multiple cores of the fused structure were assumed to start with propagating light that is equal in intensity and phase. Then, analysis was performed to determine how the light mixes and interferes as it propagates along the structure, loosely guided by those cores.

FIG. 7A, FIG. 7B, FIG. 7C, and FIG. 7D show some examples of calculated output intensity from each of the fibers for different configurations of optical couplers according to the present invention, in response to uniform and collimated illumination. The figures are not the actual light patterns, just a representation of the intensity from each fiber, laid out in the same pattern that the cores had within the fused region. The actual intensity patterns may vary from the theory for a number of reasons, such as the presence of the capillary walls, or nonuniform or inaccurate fiber or device stretching. However, the fabrication parameters (fiber type, stretch, cleave length) can be varied until the dark fibers appear in the illumination test.

FIG. 7A illustrates the calculated output from a coupler made from 7 fibers and fed with 6 lasers. In FIG. 7A, the center fiber cutoff wavelength $\lambda_c$=812 nm and the cutoff wavelength for the fibers arranged in a ring around the center fiber $\lambda_c$=935 nm. The fibers in the coupler are stretched 3.4 times their original length and the overall length of the coupler is 12.8 mm.

Figure 7B:
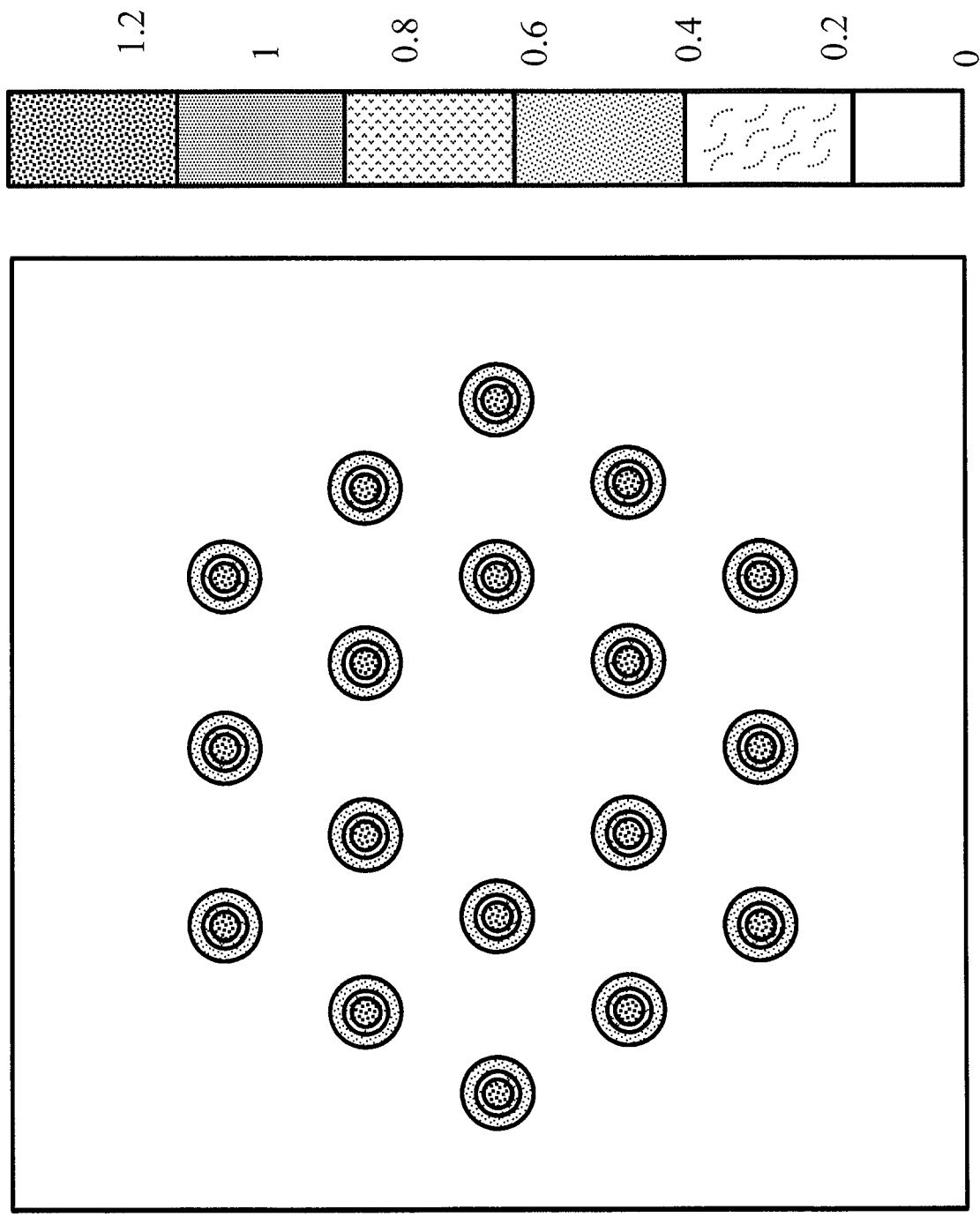

FIG. 7B illustrates the calculated output from a coupler made from 19 fibers and fed with 18 lasers. In FIG. 7B, the center fiber cutoff wavelength $\lambda_c$=737 nm and the cutoff wavelength for the fibers arranged in an inner ring around the center fiber $\lambda_c$=857 nm and the cutoff wavelength for the fibers arranged in an outer ring around the inner ring $\lambda_c$=935 nm. The fibers in the coupler are stretched 3.2 times their original length and the overall length of the coupler is 25 mm.

Figure 7C:
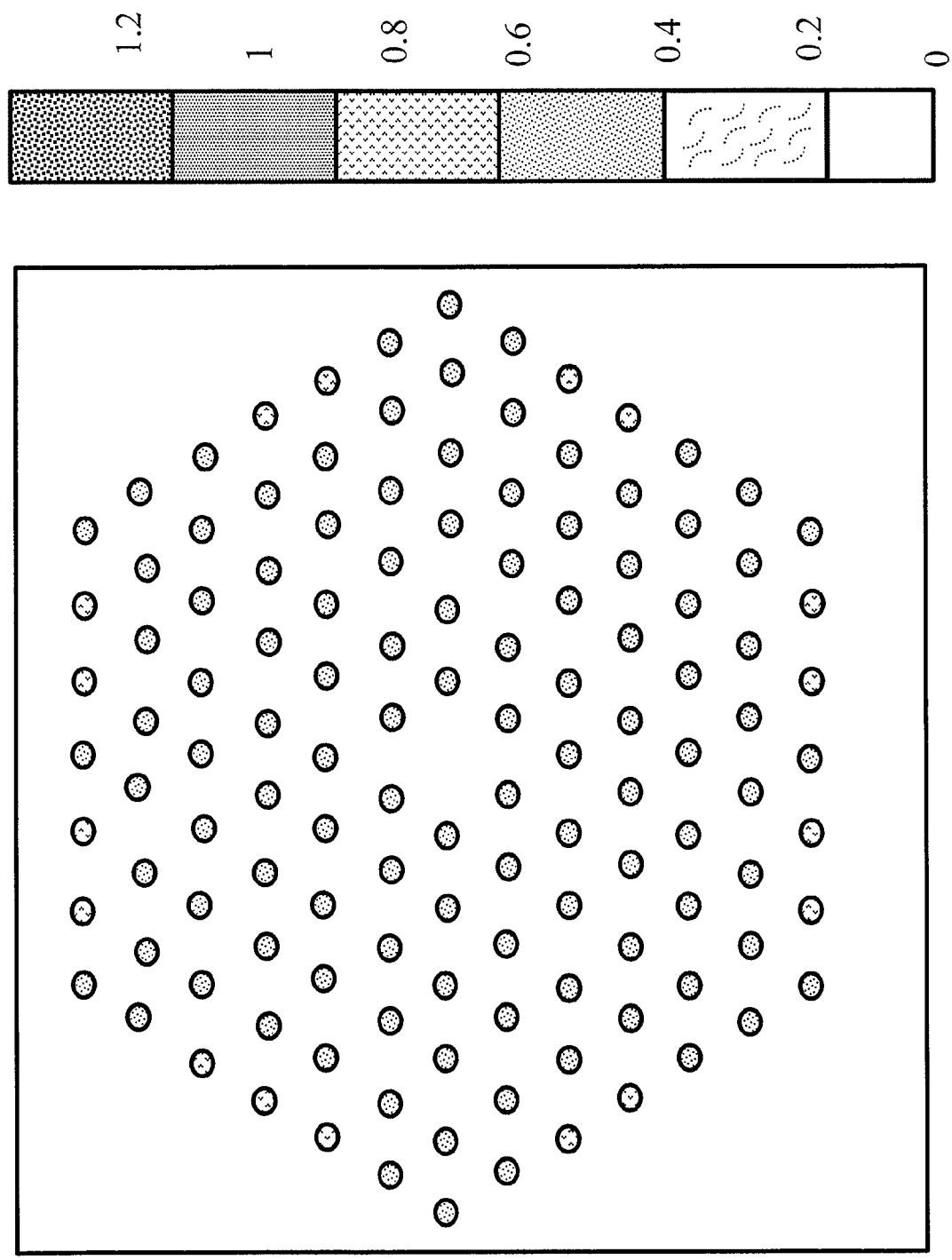

FIG. 7C illustrates the calculated output from a coupler made from 127 fibers and fed with 126 lasers. In FIG. 7C, the center fiber cutoff wavelength $\lambda_c$=737 nm and the cutoff wavelength for the fibers arranged in the inner rings around the center fiber $\lambda_c$=857 nm and the cutoff wavelength for the fibers arranged in an outer ring around the inner rings $\lambda_c$=935 nm. The fibers in the coupler are stretched 3.3 times their original length and the overall length of the coupler is 14.4 mm.

Figure 7D:
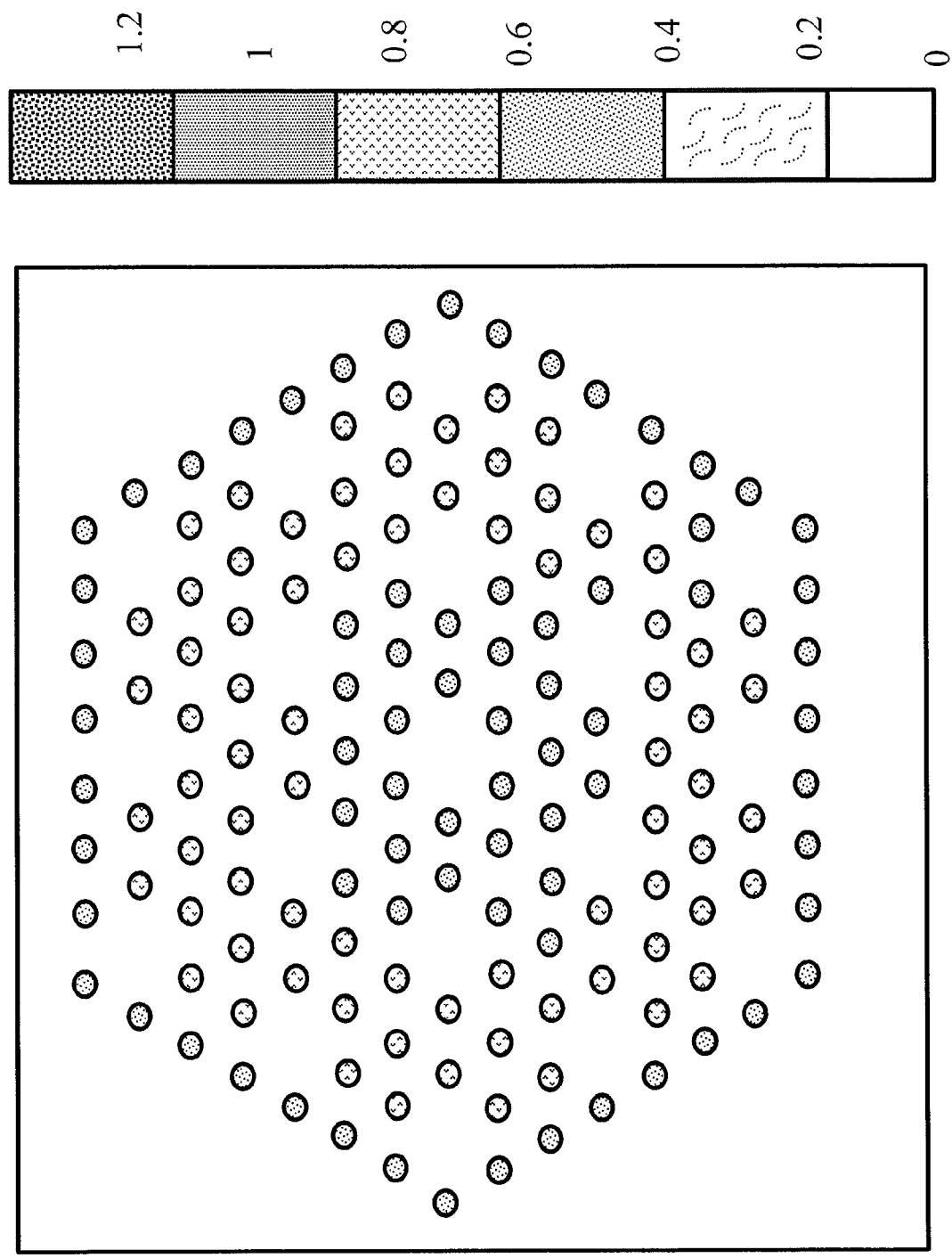

FIG. 7D illustrates the calculated output from a coupler made from 217 fibers and fed with 198 lasers. In FIG. 7D, the center fiber cutoff wavelength $\lambda_c$=737 nm and the cutoff wavelength for the fibers arranged in an inner ring around the center fiber $\lambda_c$=857 nm and the cutoff wavelength for the fibers arranged in an outer ring around the inner ring $\lambda_c$=912 nm. The fibers in the coupler are stretched 3.3 times their original length and the overall length of the coupler is 7.9 mm.

Dark fiber couplers according to embodiments of the present invention mix the light from various independent fiber laser or fiber-coupled lasers. Such dark fiber couplers have a reflective surface that is the output of the combined lasers. The reflective surface both reflects light back into the fibers of the dark fiber coupler and provides a combined laser output. The dark fiber coupler couples fractions of the combined light back into the fibers to stimulate self-organization of the laser light. Finally, the dark fiber coupler is configured such that it discriminates in favor of a flat wavefront output.

The aforementioned dark fiber couplers provide a flat wavefront coherent output, but they are not stable against perturbations of the refractive index of the core and the cladding of individual fibers in the couplers. Herein, a particular geometry of all-fiber coupler is provided that has a flat wavefront coherent output and is also stable against perturbations of the refractive index of the core and the cladding of the individual fibers of the coupler.

Figure 8A:
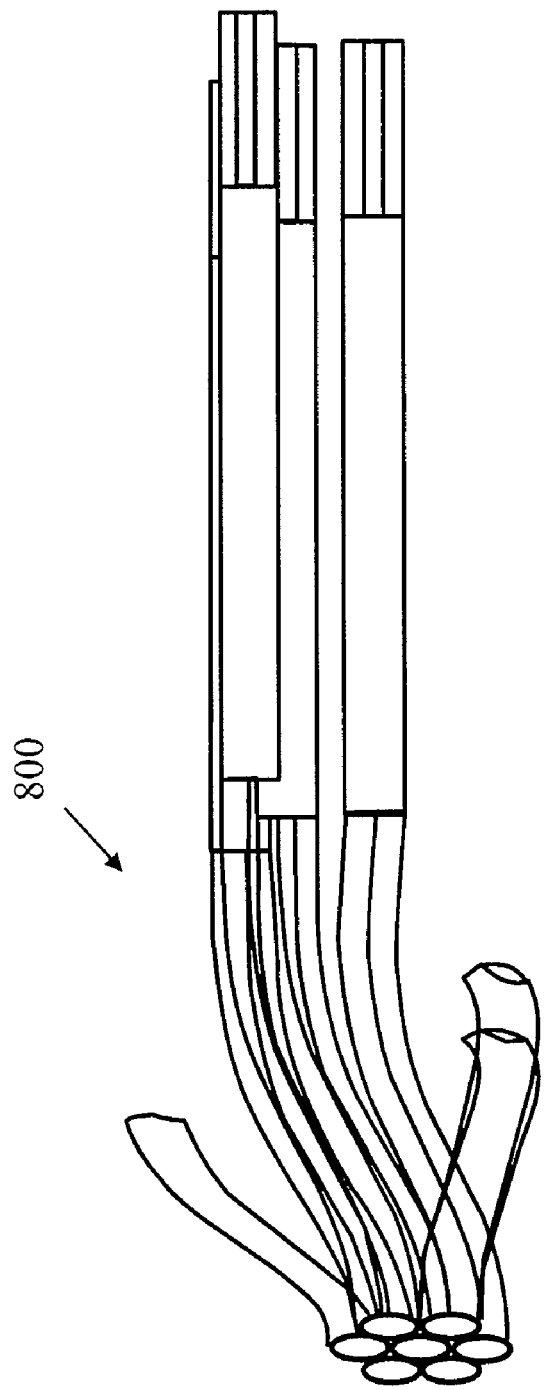
FIG. 8A is a design of an all-fiber coupler depicting a close-packed hexagonal array geometry according to an exemplary embodiment of the present invention.
Figure 8B:
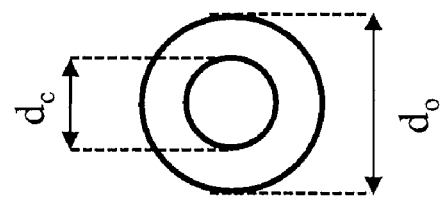
FIG. 8B depicts the core diameter and fiber width.

FIG. 8A is a design of an all-fiber coupler 800 depicting a close-packed hexagonal array geometry for a stable coherent fiber laser array output according to an exemplary embodiment of the present invention. FIG. 8B depicts the core diameter $d_c$ and outer diameter $d_o$. The all-fiber coupler 800 has the following properties: (1) one or more of the fiber pigtails are dark due to destructive interference; (2) the basic geometry is that of a close-packed hexagonal array having 1+3n(n+1) fibers (e.g., 7, 19, 37, 61, etc.) with (3/2)(n²+3n)−2 light fibers and (3/2)(n²−n)+3 interferometrically dark fibers, with n being an integer greater than or equal to 1; (3) the fibers have identical outer diameters $d_o$, but different core diameters $d_c$; (4) the couplers have a symmetry that does not allow more than one radiation pattern to satisfy the criteria of the dark fiber laser pattern; and (5) the couplers meet a modeling test of stability in simulations of multiple fibers. The modeling test of stability models the stability of multiple fibers in operation as refractive indexes of the core and cladding of the individual fibers are perturbed. Temperature variations of the multiple lasers during operation produce variations in the refractive indexes of the core and cladding of the individual fibers. The all-fiber coupler 800 that satisfies that above identified five parameters provides a flat wavefront coherent output that is also stable against temperature/refractive index perturbations. Further, the particular geometry of the all-fiber coupler 800 tends to be stable with manufacturing differences in fiber properties such as core size, refractive index of core and cladding, taper ratio, and wavelength of seed source.

FIG. 9A, FIG. 9B, FIG. 9C, and FIG. 9D depict the optical fields of an all-fiber geometry according to an exemplary embodiment of the present invention. In an exemplary embodiment of the present invention, n=1 and the all-fiber geometry has 7 fiber pigtails with 4 light fibers and 3 interferometrically dark fibers. The 3 interferometrically dark fibers are located at an outer edge of the close-packed hexagonal array with the remaining fibers being light fibers. For the particular geometry, FIG. 9A depicts the amplitude at the cleaved face, FIG. 9B depicts the amplitude in the coupler just before separating into the 7 fiber pigtails, FIG. 9C depicts the phase at the cleaved face, and FIG. 9D depicts the phase in the coupler just before separating into the 7 fiber pigtails. In simulations, such a 7 fiber configuration has been shown to provide an output that has a stability greater than 99%.

Figure 10:
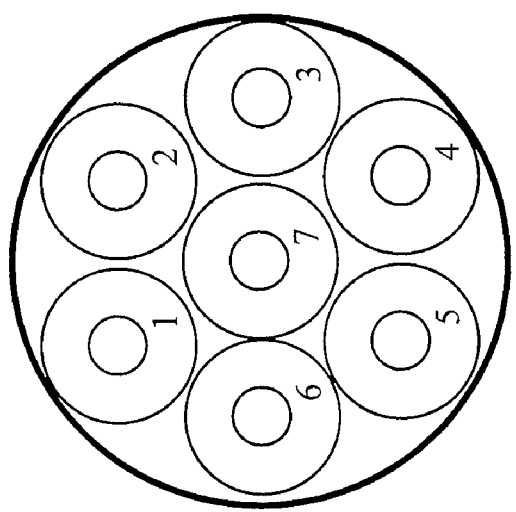
FIG. 10 depicts the arrangement of the all-fiber close-packed hexagonal array geometry with n=1.

FIG. 10 depicts the arrangement of the all-fiber close-packed hexagonal array geometry with n=1. The black center is the core of the fiber, which size is exaggerated compared with the cladding. In one exemplary embodiment of the dark-fiber coupler for the realization of a stable coherent fiber laser array output with n=1, fibers 1 through 7, as indicated in FIG. 10, have the following core diameters before the taper:8.25 um, 8 um, 8.25 um, 8 um, 8.25 um, 8 um, and 8.16 um, respectively. Fibers 2, 4, 6 are dark fibers and fibers 1, 3, 5, and 7 are light fibers. The cladding diameters and their mutual distance are 50 um. The refractive index of the cores is 1.4567 and the cladding index is 1.45.

Figure 11:
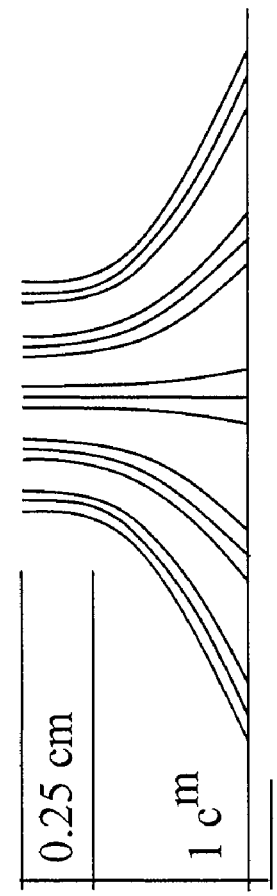
FIG. 11 depicts one exemplary arrangement of the tapering of the all-fiber close-packed hexagonal array geometry with n=1.

FIG. 11 depicts one exemplary arrangement of the tapering of the all-fiber close-packed hexagonal array geometry with n=1. In one exemplary embodiment, the all-fiber close-packed hexagonal array geometry with n=1 is tapered as depicted in FIG. 11, with a taper strength/ratio=3, a taper distance=1 cm, and the straight length=0.25 cm.

Figure 12:
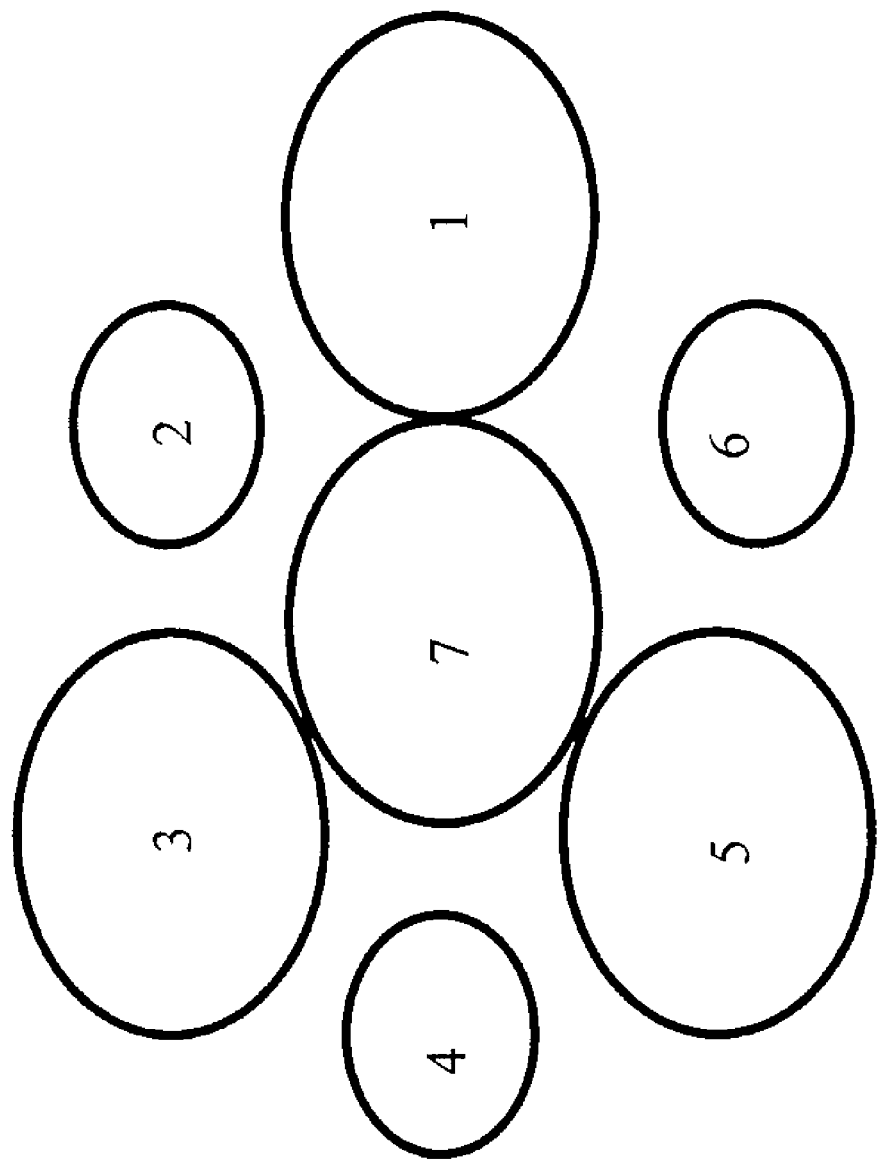
FIG. 12 depicts a 7-fiber coupler, the smaller circles being the dark fibers and the larger circles being the light fibers.

FIG. 12 depicts a 7-fiber coupler, the smaller circles being the dark fibers and the larger circles being the light fibers. The different diameters of the circles show which fibers are light fibers and which are dark fibers and do not represent a difference in fiber parameters. The all-fiber close-packed hexagonal array geometry with n=1 is the 7-fiber coupler. As depicted in FIG. 12, the 7-fiber coupler has 3 dark fibers and 4 light fibers. The dark fibers are 2, 4, and 6 and are shown with smaller circles. The light fibers are 1, 3, 5, and 7 and are shown with larger circles.

While FIG. 10, FIG. 11, and FIG. 12 and the accompanying description describe a particular embodiment of an all-fiber close-packed hexagonal array geometry with n=1, the invention is not thereby limited to the specified core diameters, cladding diameters, cladding mutual distance, core refractive index, cladding index, tapering arrangement, and other parameters of the laser fibers, as the dark-fiber coupler for the realization of a stable coherent fiber laser array output may be realized by a different set of laser fiber parameters and arrangements within the close-packed hexagonal array geometry.

Figure 13:
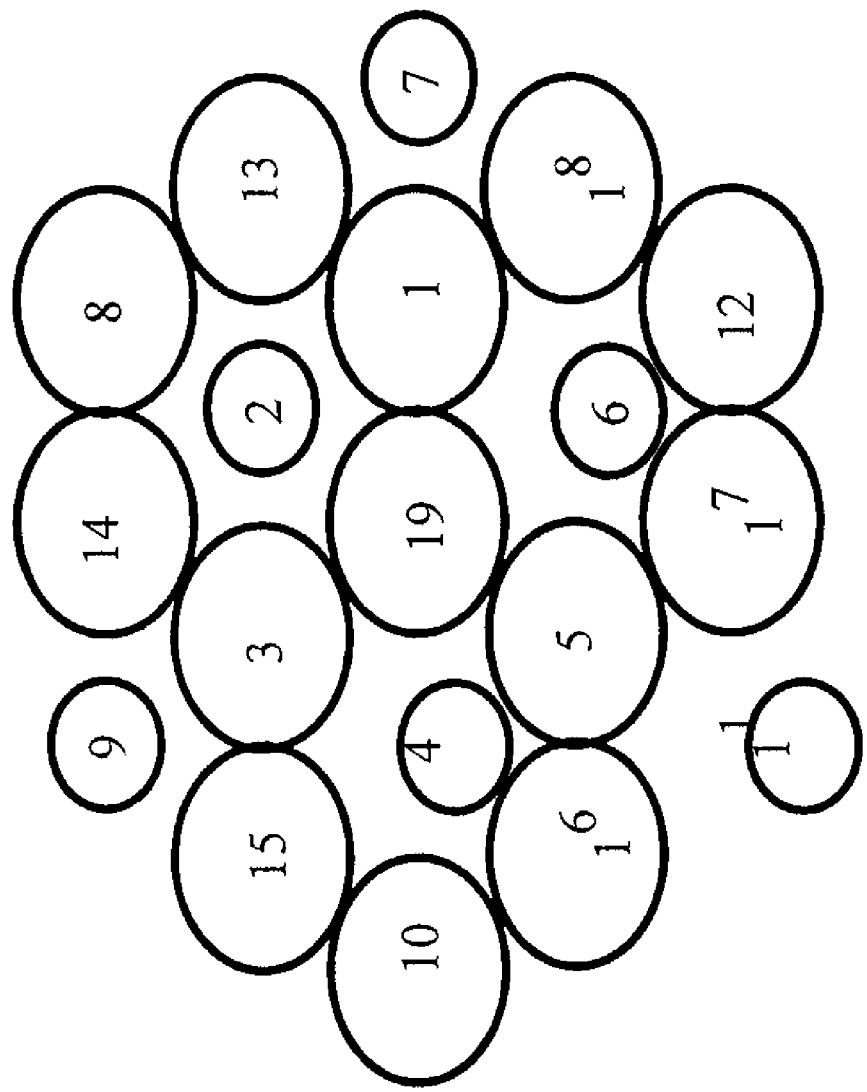
FIG. 13 depicts a 19-fiber coupler, the smaller circles being the dark fibers and the larger circles being the light fibers.

FIG. 13 depicts a 19-fiber coupler, the smaller circles being the dark fibers and the larger circles being the light fibers. The different diameters of the circles show which fibers are light fibers and which are dark fibers and do not represent a difference in fiber parameters. The all-fiber close-packed hexagonal array geometry with n=2 is the 19-fiber coupler. As depicted in FIG. 13, the 19-fiber coupler has 6 dark fibers and 13 light fibers. The dark fibers are 2, 4, 6, 7, 9, and 11. The light fibers are 1, 3, 5, 8, 10, 12, 13, 14, 15, 16, 17, 18, and 19.

Figure 14:
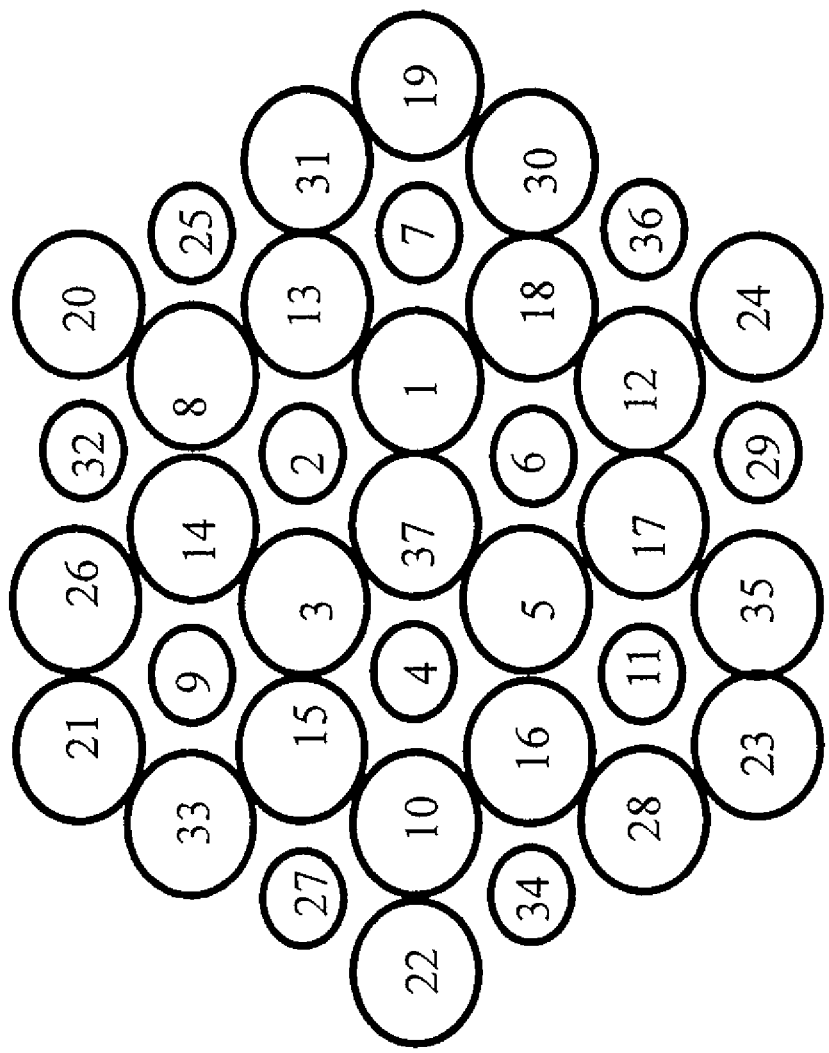
FIG. 14 depicts a 37-fiber coupler, the smaller circles being the dark fibers and the larger circles being the light fibers.

FIG. 14 depicts a 37-fiber coupler, the smaller circles being the dark fibers and the larger circles being the light fibers. The different diameters of the circles show which fibers are light fibers and which are dark fibers and do not represent a difference in fiber parameters. The all-fiber close-packed hexagonal array geometry with n=3 is the 37-fiber coupler. As depicted in FIG. 14, the 37-fiber coupler has 12 dark fibers and 25 light fibers. The dark fibers are 2, 4, 6, 7, 9, 11, 25, 27, 29, 32, 34, and 36. The remaining fibers are light fibers.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method of providing a collimated output from a plurality of lasers, comprising:
   coupling each output from each laser of the plurality of lasers to a separate optical fiber in a plurality of optical fibers;
   combining the plurality of optical fibers to form a reflective surface receiving the outputs from the plurality of lasers;
   coupling fractions of light output from each optical fiber into other optical fibers to stimulate self-organized phasing of the plurality of lasers; and
   configuring the combination of the plurality of optical fibers to discriminate in favor of a flat wavefront output from the combination of the plurality of optical fibers,
   wherein the plurality of optical fibers are arranged in a hexagonal array and comprise $1+3n(n+1)$ fibers with $(3/2)(n^2-n)+3$ interferometrically dark fibers and $(3/2)(n^2+3n)-2$ light fibers, where n is an integer greater than or equal to 1.

2. The method of claim 1, wherein the interferometrically dark fibers have a propagation constant different from a propagation constant of the light fibers.

3. The method of claim 1, wherein the interferometrically dark fibers are configured to transmit no light due to destructive interference between light from a laser coupled to the interferometrically dark fibers and the fractions of light output from the light fibers.

4. The method of claim 1, wherein the interferometrically dark fibers and the light fibers have substantially identical outer diameters, but different core diameters.

5. The method of claim 1, wherein n is 1 such that there are 7 fibers with 3 interferometrically dark fibers and 4 light fibers.

6. The method of claim 1, wherein n is 2 such that there are 19 fibers with 6 interferometrically dark fibers and 13 light fibers.

7. The method of claim 1, wherein the hexagonal array of optical fibers is close-packed, and every other optical fiber at an outer edge of the close-packed hexagonal array is an interferometrically dark fiber and remaining fibers are light fibers.

8. A method of providing a collimated output from a plurality of lasers, comprising:
   coupling each output from each laser of the plurality of lasers to a separate optical fiber in a plurality of optical fibers;
   combining the plurality of optical fibers to foam a reflective surface receiving the outputs from the plurality of lasers;
   coupling fractions of light output from each optical fiber into other optical fibers to stimulate self-organized phasing of the plurality of lasers; and
   configuring the combination of the plurality of optical fibers to discriminate in favor of a flat wavefront output from the combination of the plurality of optical fibers,
   wherein the plurality of optical fibers are arranged in a hexagonal array and comprise $1+3n(n+1)$ fibers with $(3/2)(n^2-n)+3$ interferometrically dark fibers and $(3/2)(n^2+3n)-2$ light fibers, where n is an integer greater than or equal to 1, the interferometrically dark fibers having a propagation constant different from a propagation constant of the light fibers, the interferometrically dark fibers being configured to transmit no light due to destructive interference between light from a laser coupled to the interferometrically dark fibers and the fractions of light output from the light fibers, the interferometrically dark fibers and the light fibers having substantially identical outer diameters, but different core diameters.

9. An optical coupler comprising:
   a plurality of optical fibers arranged in a hexagonal array having $1+3n(n+1)$ fibers with $(3/2)(n^2-n)+3$ interferometrically dark fibers and $(3/2)(n^2+3n)-2$ light fibers, where n is an integer greater than or equal to 1, each optical fiber having a first end and a second end, the plurality of optical fibers being fused together along a section of each optical fiber proximate the first end of each optical fiber to form a fused section having a fiber axis, the fused section of the plurality of optical fibers being tapered to form a tapered region; and
   a facet at an end of the fused section, the facet disposed in a direction perpendicular to the fiber axis.

10. The optical coupler as claimed in claim 9, wherein the interferometrically dark fibers have a propagation constant different from a propagation constant of the light fibers.

11. The optical coupler as claimed in claim 9, wherein the interferometrically dark fibers are configured to transmit no light due to destructive interference between light from a laser coupled to the interferometrically dark fibers and the fractions of light output from the light fibers.

12. The optical coupler as claimed in claim 9, wherein the interferometrically dark fibers and the light fibers have substantially identical outer diameters, but different core diameters.

13. The optical coupler as claimed in claim 9, wherein n is 1 such that there are 7 fibers with 3 interferometrically dark fibers and 4 light fibers.

14. The optical coupler as claimed in claim 9, wherein n is 2 such that there are 19 fibers with 6 interferometrically dark fibers and 13 light fibers.

15. The optical coupler as claimed in claim 9, wherein the hexagonal array of optical fibers is close-packed, and every other optical fiber at an outer edge of the close-packed hexagonal array is an interferometrically dark fiber and remaining fibers are light fibers.

16. An optical coupler comprising:
   a plurality of optical fibers arranged in a hexagonal array having $1+3n(n+1)$ fibers with $(3/2)(n^2-n)+3$ interferometrically dark fibers and $(3/2)(n^2+3n)-2$ light fibers, where n is an integer greater than or equal to 1, each optical fiber having a first end and a second end, the plurality of optical fibers being fused together along a section of each optical fiber proximate the first end of each optical fiber to form a fused section having a fiber axis, the fused section of the plurality of optical fibers being tapered to form a tapered region; and
   a facet at an end of the fused section, the facet disposed in a direction perpendicular to the fiber axis,
   wherein the interferometrically dark fibers have a propagation constant different from a propagation constant of the light fibers and configured to transmit no light due to destructive interference between light from a laser coupled to the interferometrically dark fibers and the fractions of light output from the light fibers, and
   wherein the interferometrically dark fibers and the light fibers have substantially identical outer diameters, but different core diameters.

17. A laser array comprising:

a plurality of laser active optical paths, wherein each laser active optical path comprises:

a doped segment adapted to receive laser pumping energy;

a reflector connection segment;

a coupling connection segment, and an optical coupler, the optical coupler comprising:

a plurality of optical fibers arranged in a hexagonal array comprising $1+3n(n+1)$ fibers with $(3/2)(n^2-n)+3$ interferometrically dark fibers and $(3/2)(n^2+3n)-2$ light fibers, where n is an integer greater than or equal to 1, each optical fiber having a first end and a second end, the first end of each optical fiber being coupled to one laser active optical path at the coupling connection segment of the laser active optical path and the plurality of optical fibers being fused together along a section of each optical fiber proximate the second end of each optical fiber to form a fused section having a fiber axis, the fused section of the plurality of optical fibers being tapered to form a tapered region; and a facet, said facet being formed by cleaving or cutting and polishing the tapered region in a direction perpendicular to the fiber axis, wherein the interferometrically dark fibers have a propagation constant different from a propagation constant of the light fibers and are configured to transmit no light due to destructive interference between light from a laser coupled to the interferometrically dark fibers and at least a portion of light output from the light fibers.

18. The laser array as claimed in claim 17, wherein the interferometrically dark fibers and the light fibers have substantially identical outer diameters, but different core diameters.

19. The laser array as claimed in claim 17, wherein n is 1 such that there are 7 fibers with 3 interferometrically dark fibers and 4 light fibers.

20. The laser array as claimed in claim 17, wherein n is 2 such that there are 19 fibers with 6 interferometrically dark fibers and 13 light fibers.

* * * * *